US007945565B2

(12) United States Patent
Poblete et al.

(10) Patent No.: US 7,945,565 B2
(45) Date of Patent: May 17, 2011

(54) METHOD AND SYSTEM FOR GENERATING A HYPERLINK-CLICK GRAPH

(75) Inventors: Barbara Poblete, Barcelona (ES); Aristides Gionis, Barcelona (ES)

(73) Assignee: Yahoo! Inc., Sunnyvale, CA (US)

( * ) Notice: Subject to any disclaimer, the term of this patent is extended or adjusted under 35 U.S.C. 154(b) by 351 days.

(21) Appl. No.: 12/275,155

(22) Filed: Nov. 20, 2008

(65) Prior Publication Data

US 2010/0125572 A1 May 20, 2010

(51) Int. Cl.
*G06F 7/00* (2006.01)
*G06F 17/30* (2006.01)

(52) U.S. Cl. ...................................... 707/722; 707/798
(58) Field of Classification Search .................. None
See application file for complete search history.

(56) References Cited

U.S. PATENT DOCUMENTS

2008/0313119 A1* 12/2008 Leskovec et al. .............. 706/46
2009/0049021 A1* 2/2009 Chitrapura et al. ............. 707/3

OTHER PUBLICATIONS

R. Baeza-Yates. Graphs from search engine queries. SOFSEM 2007: Theory and Practice of Computer Science, pp. 1-8, 2007.
L. Becchetti, C. Castillo, D. Donato, S. Leonardi and R. Baeza-Yates. Link-based characterization and detection of Web Spam. In Second International Workshop on Adversarial Information Retrieval on the Web (AIRWeb), Seattle, USA, Aug. 2006.
D. Beeferman and A. Berger. Agglomerative clustering of a search engine query log. pp. 407-416, 2000.
S. Brin and L. Page. The anatomy of a large-scale hypertextual Web search engine. Computer networks and ISDN systems, 1998.
N. Craswell and M. Szummer. Random walks on the click graph. In SIGIR '07: Proceedings of the 30th annual international ACM SIGIR conference on Research and development in information retrieval, New York, NY, USA, 2007, ACM Press.
N. Craswell, O. Zoeter, M. Taylor, and B. Ramsey. An experimental comparison of click position-bias models. In WSDM '08: Proceedings of the international conference on Web search and web data mining, pp. 87-94, New York, NY, USA, 2008. ACM.
B. D. Davison. Topical locality in the web. In Proceedings of the 23rd annual international ACM SIGIR conference on research and development in information retrieval, Athens, Greece, 2000. ACM Press.
G. Dupret, V. Murdock, and B. Piwowarski. Web search engine evaluation using clickthrough data and a user model. In WWW2007 workshop Query Log Analysis: Social and Technological Challenges, 2007.
D. Fetterly. Adversarial information retrieval: The manipulation of web content. ACM Computing Reviews, Jul. 2007.
Z. Gyongyi and H. Garcia-Molina. Spam: It's not just for inboxes anymore. IEEE Computer Magazine, 2005.
G. Jeh and J. Widom. Simrank: a measure of structural-context similarity. In KDD '02: Proceedings of the eighth ACM SIGKDD international conference on Knowledge discovery and data mining, New York, NY, USA, 2002. ACM Press.
J.M. Kleinberg. Authoritative sources in a hyperlinked environment. J. ACM, 1999.

(Continued)

*Primary Examiner* — Cam Y T Truong
(74) *Attorney, Agent, or Firm* — Hickman Palermo Truong & Becker LLP (57) ABSTRACT

A method of ascribing scores to web documents and search queries generates a hyperlink-click graph by taking the union of the hyperlink and click graphs, takes a random walk on the hyperlink-click graph, and associates the transition probabilities resulting from the random walk with scores for each of the documents and search queries.

21 Claims, 3 Drawing Sheets

OTHER PUBLICATIONS

W. Kruskal and L. Goodman. Measures of association for cross classifications. Journal of the American Statistical Association, vol. 49, No. 268, (Dec. 1954) pp. 732-764.

M. Lifeantsev. Voting model for ranking Web pages. In P. Graham and M. Maheswaran, editors, Proceedings of the International Conference on Internet Computing, pp. 143-148, Las Vegas, Nevada, USA, Jun. 2000. CSREA Press.

R. Motwani and P. Raghavan. Randomized Algorithms. Cambridge University Press, 1995.

F. Radlinski. Addressing malicious noise in clickthrough data. In Learning to Rank for Information Retrieval Workshop at SIGIR 2007, 2007.

F. Radlinski and T. Joachims. Query chains; learning to rank from implicit feedback. In KDD '05: Proceeding of the eleventh ACM SIGKDD international conference on Knowledge discovery in data mining, New York, NY, USA 2005. ACM Press.

J. Srivastava, R. Cooley, M. Deshpande, and P.-N. Tan. Web usage mining: discovery and applications of usage patterns from web data. SIGKDD Explor. Newsl., 1(2):12-23, 2000.

W. Xi, B. Zhang, Z. Chen, Y. Lu, S. Yan, W.-Y. Ma, and E.A. Fox. Link fusion: a unified link analysis framework for multi-type interrelated data objects. In WWW '04: Proceedings of the 13th international conference on World Wide Web, pp. 319-327, New York, NY, USA, 2004. ACM.

Krishna Bharat and Monika R. Henzinger. Improved Algorithms for Topic Distillation in a Hyperlinked Environment. 21st ACM SIGIR Conference on Research and Development in Information Retrival, 1998, Melbourne, Australia. ACM 1-58113-015-5-8/98.

* cited by examiner

METHOD AND SYSTEM FOR GENERATING A HYPERLINK-CLICK GRAPH

BACKGROUND

1. Field of the Invention

Aspects of the present invention relate generally to the unification of users' browsing and searching activities online, and the use of said unification to improve various web-mining applications, including the ranking of web documents.

2. Description of Related Art

The behavior of most web users involves both browsing and searching, and these behaviors can be modeled generally by hyperlink and click graphs, respectively. A hyperlink graph is generally a directed graph among web pages where the edges of the graph represent hyperlinks between web documents; a click graph is generally a bipartite graph between search queries submitted to a search engine and web documents linked to by the search results for those queries, where the edges of the graph connect the search queries to the web documents associated with the search results actually clicked on by the user. Conventional methodologies keep the two models apart in their application to various web-mining tasks (e.g., document ranking, spam detection, etc.), where they remain quite susceptible to noise and sub-optimal performance.

Thus, it is desirable to combine both models in a way that is conducive to the combination's application to various web-mining tasks, in an effort to increase the performance, stability, etc. of those tasks.

SUMMARY

In light of the foregoing, it is a general object of the present invention to provide a unified model of web user behaviors, which unified model may inform various web-mining tasks.

DETAILED DESCRIPTION

Detailed descriptions of one or more embodiments of the invention follow, examples of which may be graphically illustrated in the drawings. Each example and embodiment is provided by way of explanation of the invention, and is not meant as a limitation of the invention. For example, features described as part of one embodiment may be utilized with another embodiment to yield still a further embodiment. It is intended that the present invention include these and other modifications and variations.

Aspects of the present invention are described below in the context of providing a unified model of users' web behavior such that it may be applied to various web-mining tasks.

Since the behavior of most web users includes both browsing and searching, random walks on a graph which combines these behaviors can be used to more accurately capture relations between web documents than when using a graph that tracks only one type of behavior. The stationary distribution scores derived from random walks in the combined graph can be used as a scoring function for ranking. The combined graph may offer better performance than the two graphs on their own, and it also generally is more stable and robust when confronted with variations or "noise" in, for example, query-log click-through data. A side effect of the approach outlined herein is that search queries also are ranked, which rankings can be used for query recommendation and various other applications.

Throughout this disclosure, reference is made to "system," which is used to denote a search infrastructure through which an Internet search engine operates (e.g., Yahoo!® Search, etc.). A search infrastructure may be tasked with various jobs, including, for example, crawling the Internet and indexing documents found therein (e.g., web pages, graphic files, etc.), determining relationships between those documents, providing search results in response to a search query from a user, determining relationships between the documents clicked on by users in response to a search query and the query itself, etc.

Figure 1:
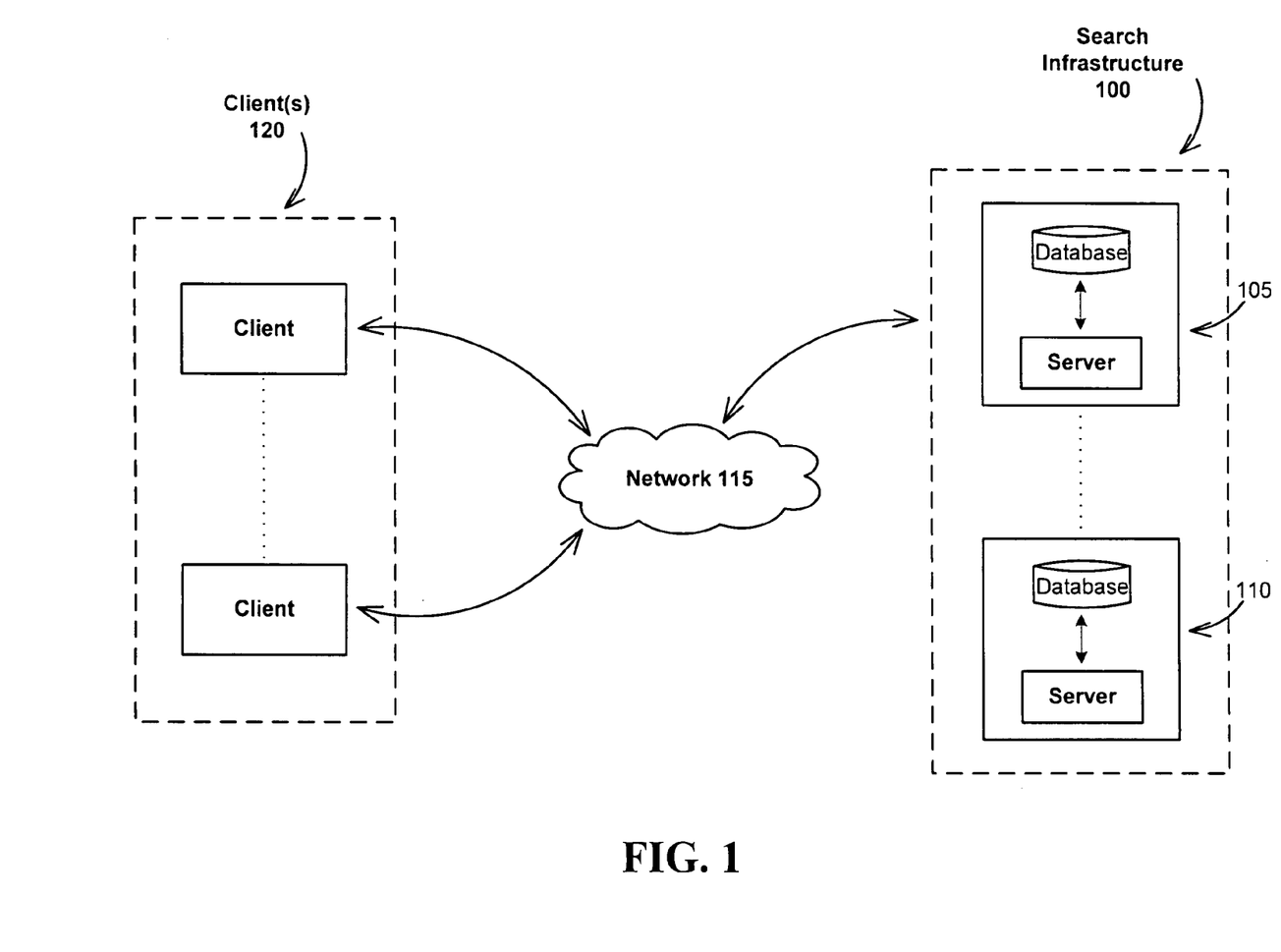
FIG. 1 is a functional block diagram of the general architecture of an exemplary embodiment of the present invention.

FIG. 1 is a simplified block diagram illustrating how the invention may be employed in accordance with the detailed description. Search infrastructure 100, as described above, may include any of a number of servers 105 and 110 (which optionally may include databases), etc. required for its operation; search infrastructure 100 also may power the methods used to determine relationships between documents, and between documents and search queries, as described herein. Client(s) 120 may comprise a user at a computer carrying out typical web actions (e.g., browsing, searching, switching between browsing and searching, etc.). Search infrastructure 100 and Client(s) 120 are linked together through Network 115 (e.g., the Internet, etc.).

Figure 2:
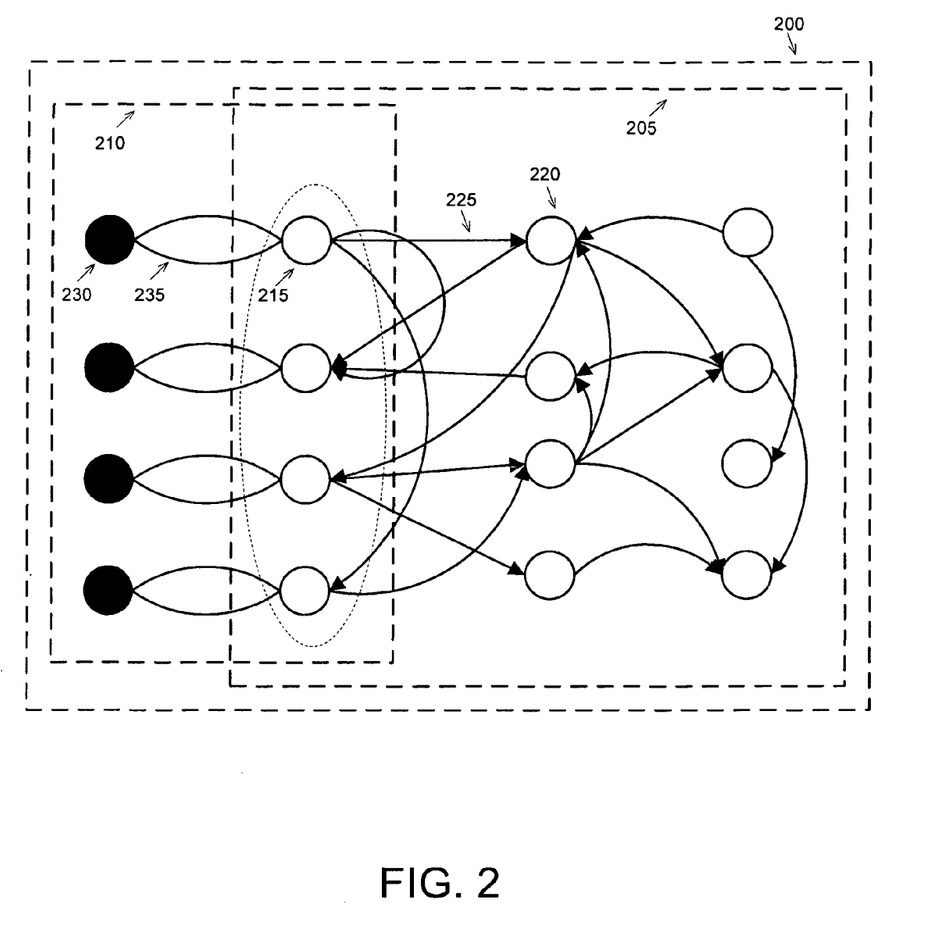
FIG. 2 contains simplified representations of a click graph, a hyperlink graph, and a hyperlink-click graph.

Throughout this disclosure, reference is made to "hyperlink graph," which is used to denote generally a directed graph among web pages where the nodes of the graph represent documents, and edges of the graph represent hyperlinks between those documents. FIG. 2 illustrates generally a hyperlink graph. Hyperlink graph 205 is a directed graph where nodes 215 and 220 (i.e., documents) are connected by directed edge 225 (i.e., a hyperlink from the document represented by node 215 to the document represented by node 220). A hyperlink graph may be generated by a "hyperlink graph generator," which may be implemented either in software or hardware, and which also may be considered part of search infrastructure 100 (e.g., as implemented by, say, server 105).

Throughout this disclosure, reference is made to "click graph," which is used to denote generally a bipartite graph between search queries submitted to a search engine and documents linked to by the search results for those queries, where the edges of the graph represent the documents that users get to by clicking the search results. FIG. 2 illustrates generally a click graph. Click graph 210 is a bipartite graph whose nodes can be either search queries or documents; for example, node 230 is a query, and node 215 is a document. An undirected edge exists between node 230 and node 215 because a user clicked on a search result corresponding to the query represented by node 230, which took him to the document represented by node 215. A click graph may be generated by a "click graph generator," which may be implemented either in software or hardware, and which also may be considered part of search infrastructure 100 (e.g., as implemented by, say, server 105).

At an intuitive level, the hyperlink and click graphs capture two of the most common types of user behavior on the web: browsing and searching. A user who browses the web effectively follows edges on the hyperlink graph, while a user who makes search queries and consequently clicks on the results, follows edges on the click graph. Together, browsing and searching correspond to prototypical user actions on the web.

The edges of the two different graphs can capture certain semantic relations between the objects they represent. An example of such a relation is similarity: two web pages connected together by a hyperlink, or a search query and a web page connected by a click, are more likely to be similar than two non-connected objects. Another semantic relation is authority endorsement: a hyperlink from a web page u to a web page v, or a click from a search query q to the web page v, can both be viewed as implicit "votes" for web page v.

Both the hyperlink and click graphs may have certain disadvantages. For example, in light of applications using links in the hyperlink graph to compute importance scores for web pages, concerted efforts have been made to increase the scores of certain web pages by increasing the number and weight of links pointing to them. Such efforts can take the form of "spam" pages that attempt to attract undeservedly high scores to a particular web document.

Regarding the click graph, one disadvantage is sparsity: a web page to be clicked for a search query must first appear in the list of results for that search query, which may not be trivial considering the vast amount of web pages likely available for each search query. Another related problem is having a large dependence on textual matching: typically, search engines emphasize precision (i.e., the fraction of relevant documents returned by a search engine with respect to all relevant documents indexed by the search engine) at the expense of recall (i.e., the fraction of relevant documents returned by a search engine with respect to all documents returned by the search engine), and display results that match exactly all the query terms, causing many relevant pages not to be connected with queries if they are not exact matches.

The above and other disadvantages may be mitigated by combining the two graphs into a hybrid graph—the hyperlink-click graph—which is a union of the hyperlink and click graphs; its nodes are both documents and search queries, while it has directed edges between documents according to the hyperlink graph and undirected edges between search queries and documents according to the click graph. The union of the hyperlink graph, which is based on a connectivity structure, and the click graph, which is based on usage information, draws on the best of both graphs while reducing the inherent noise present in each. FIG. 2 illustrates generally a hyperlink-click graph. Hyperlink-click graph 200 is the union of the hyperlink and click graphs, as discussed above with respect to FIG. 2. A hyperlink-click graph may be generated by a "hyperlink-click graph generator," which may be implemented either in software or hardware, and which also may be considered part of search infrastructure 100 (e.g., as implemented by, say, server 105).

Ranking documents according to scores obtained from the hyperlink-click graph is similar to using the best of the hyperlink and click graphs, and compensates where one of the graphs alone fails, and is thus more robust overall. For example, using clicks to include user feedback on the hyperlink graph improves its resistance against spam. In the spam context, it is known that link-based features extracted from the hyperlink graph can be used to improve content-based spam-detection algorithms. For example, known algorithms attempt to identify spam sites by building a classifier on a large number of features extracted from the hyperlink graph (e.g., in-degree and out-degree of a node in the graph, edge-reciprocity, assortativity, etc.); the classifier may be enhanced by a set of similar features obtained from the hyperlink-click graph.

Similarly, by considering hyperlinks and browsing patterns, the density and connectivity of the click graph can be increased, and web pages that users might visit after issuing particular search queries can be accounted for.

Generally, the information found on the web may be analyzed from three main points of view, each associated with the predominant types of data constituting the information. The first is content, which generally is the information the web documents were designed to convey, and consists mostly of text and multimedia. The second is structure, which generally is a description of the organization of the content within the web, and includes mainly the hyperlink structure connecting documents and the methods by which they are organized into logical structures, such as, for example, web sites. The third is usage, which is data that describes the usage history of a web site, search engine, etc., and may include click-through information, as well as search queries submitted to search engines; such data may be stored in access logs of a web server and/or in logs associated with the specific applications used.

The most popular view is the one based on structure, an approach which sees the web as a graph in which documents are nodes that are connected to each other when there is at least one hyperlink from one document to the other. This graph structure has been exploited by various link-based ranking algorithms, which generally rank pages according to their importance and authority, such values estimated by analyzing the endorsements or links from other documents.

It will be appreciated that there are many other possible graph-based representations based on content and usage data found on the web, most of which have as their focus the analysis of queries from search engines and their semantic relations, as well as the relations given by clicks on common documents. Relations between queries can be inferred from common query terms or common clicked documents. In a similar way, relations between documents can be found by looking at shared links or words. The incorporation of document contents into these types of graphs is introduced from the words in search queries, their selected documents, and also by the relations induced among documents with similar words.

With respect to usage data, a common model for representing search engine query logs is in the form of a bipartite undirected graph. This graph includes two types of nodes: search queries and documents. Links between the two types of nodes are generated by user clicks from search queries to documents in the process of selecting a search result. This type of representation has been used in various contexts, including agglomerative clustering to find related search queries and documents; such context also has been expanded to include weights, where weights may be added to the undirected edges based on the number of clicks from the search query to a document. This graph is referred to as the click graph. Forward and backward random walks on this graph may be used for document ranking.

Noise and malicious manipulation of web content affect both the click and hyperlink graphs. The most typical type of manipulation is link spam on the hyperlink graph, where artificial links are created to induce higher link-based ranks on documents. Similarly, click-graph manipulation can be produced from artificial clicks on search engine results; the aim of such an attack is to manipulate ranking functions that are based on click-through information. Another type of noise that can be found on click-through data is the bias of clicks due to the position of the search result; generally, search results displayed near the top tend to be clicked on more often than those near the bottom.

Another perspective on query logs is to avoid considering the search queries individually, but instead treat them as sequences of actions. This kind of approach serves a dual purpose: it reduces the noise due to single queries, and it allows the connection of different actions of users over time.

To help explain the hyperlink-click graph, consider first the hyperlink and click graphs separately. Regarding the hyperlink graph, let N be a set of web documents D, and let the hyperlink graph $G_H=(D,H)$ be a directed graph, where there is an edge $(u,v) \in H$ if and only if document u has a hyperlink to document v, for $u, v \in D$. For a document $u \in D$, the set of in-neighbors of u (i.e., the documents that point to u) and the set of out-neighbors of u (i.e., the documents that are pointed to by u) are denoted by $N_{IN}(u)$ and $N_{OUT}(u)$, respectively; in other words, $N_{IN}(u)=\{v \in D|(v,u) \in H\}$ and $N_{OUT}(u)=\{v \in D|(u,v) \in H\}$. For $u \in D$, $d_{IN}(u)=|N_{IN}(u)|$ is the in-degree of document u, and $d_{OUT}(u)=|N_{OUT}(u)|$ is its out-degree.

For the click graph, let $Q=\{q_1, \ldots, q_M\}$ be the set of M unique search queries submitted to a search engine during a specific period of time. In practice, in order to construct the set of unique search queries some simple normalization may be assumed, such as normalizing for space, letter case, and/or ordering of the query terms. For a search query $q \in Q$, let $f(q)$ denote the frequency of the query q (i.e., how many times the query was submitted to the search engine). Also, with large-scale search engine query logs, there is usually information about which documents were clicked on by the users who submitted the queries (in addition to the information regarding which queries have been submitted); let $D=\{d_1, \ldots, d_N\}$ be the set of N web documents clicked on for those queries.

The click graph $G_C=(Q \cup D, C)$ is an undirected bipartite graph that involves the set of queries Q, the set of documents D, and a set of edges C. For $q \in Q$ and $d \in D$, the pair $(q,d)$ is an edge of C if and only if there is a user who clicked on document d after submitting the query q. The obvious prerequisite here is that the document d is in the set of results computed by the search engine for the query q. Each edge $(q,d) \in C$ is associated with a numeric weight $c(q,d)$ that is related to the number of times the document d was clicked on when shown in response to the query q.

Finally, let $N(q)=\{a|(q,a) \in C\}$ be the set of neighboring documents of a query $q \in Q$, and let $N(a)=\{q|(q,a) \in C\}$ be the set of neighboring queries of a document $a \in D$. The weighted degree of a query $q \in Q$ is defined as $d(q)=\Sigma_{a \in N(q)}c(q,a)$, and similarly, the weighted degree of a document $a \in D$ is defined as $d(a)=\Sigma_{q \in N(a)}c(q,a)$.

Given the above definitions of hyperlink and click graphs, the hyperlink-click graph can now be further defined. As discussed above, the hyperlink-click graph $G_{HC}$ can be seen as the union of the hyperlink and click graphs. In an embodiment, there is a directed edge of weight 1 between documents u and v if there is a hyperlink from u to v, and there is an undirected weighted edge between query q and document d if there are clicks from q to d (the weight of the edge is equal to the number of clicks $c(q,d)$).

By taking a "random walk" on the hyperlink-click graph (i.e., a simulation of likely user browsing and searching behavior), relationships among web objects can be more accurately captured than when using either the hyperlink or click graphs alone. Given a graph $G=(V,E)$, a random walk on G is a process that starts at a node $v_0 \in V$ and proceeds in discrete steps by selecting randomly a node of the neighbor set of the node at the current step. A random walk on a graph of N nodes can be fully described by an N×N matrix P of transition probabilities. The ith row and the ith column of P both correspond to the ith node of the graph, $i=1, \ldots, N$. Each $P_{ij}$ entry of P represents the probability that the next node will be the node j given that the current node is the node i. Thus, all rows of P sum to 1, and P is considered to be a row-stochastic matrix.

Under certain conditions (i.e., irreducibility, finiteness, and aperiodicity), a random walk is characterized by a steady-state behavior, which is known as the stationary distribution of the random walk. Formally, the stationary distribution is described by an N-dimensional vector $\pi$ that satisfies the equation $\pi P=\pi$. Alternatively, the ith coordinate $\pi_i$ of the stationary-distribution vector $\pi$, measures the frequency in which the ith node of the graph is visited during the random walk, and thus, may be used as an intuitive measure of the "importance" of each node in the graph.

Before describing a random walk on the hyperlink-click graph, it is instructional to separately describe the walk with respect to both the hyperlink and click graphs; the stationary distributions in the three graphs will be denoted by $\pi_H$, $\pi_C$, and $\pi_{HC}$, and the values of the stationary-distribution vectors will be referred to as "scores."

The random walk on the hyperlink graph corresponds to browsing the web by following hyperlinks at random from the current web page. Generally, the step of following a random hyperlink is performed with probability $\alpha$, while the walk "jumps" ("teleports," "resets," etc.) to a random page with probability $1-\alpha$ (i.e., to simulate, for example, a user who, instead of clicking on a hyperlink embedded in the current web page, goes to a completely unrelated web page via his browser's bookmark mechanism, etc.). Additionally, special care generally is taken when a dangling node—a node with no outgoing edges—is reached; typically, upon reaching a dangling node, the random walk continues by selecting a target node uniformly at random. Consequently, if $A_H$ is the adjacency matrix of the hyperlink graph $G_H$, $N_H$ is defined to be the normalized version of $A_H$ so that all rows sum to 1. Assume that $N_H$ is defined to take care of the dangling nodes, so that if a row of $A_H$ has all zeroes, then the corresponding row of $N_H$ has all values equal to $1/N$. Finally, let $1_H$ be a matrix that has the value $1/N$ in all of its entries; then, the transition-probability matrix $P_H$ of the random walk on the hyperlink graph is given by $P_H=\alpha N_H+(1-\alpha)1_H$.

In addition to yielding a better model of browsing the web graph, performing the random jumps with probability $(1-\alpha) \neq 0$ ensures the conditions sufficient for the stationary distribution to be defined.

A random walk on the click graph is similar to that of the hyperlink graph, except that the click graph is bipartite and undirected. Being bipartite creates periodicity in the random walk, while being undirected has the consequence of making the stationary distribution proportional to the degree of each node. However, assuming that random jumps are performed with probability $(1-\alpha)$, the random walk is aperiodic and irreducible (i.e., every node can be reached from every other node), and also the stationary distribution at each node is no longer a direct function of its degree.

The formalization of the random walk on the click graph is as follows. Let $A_C$ be an M×N matrix, whose M rows correspond to the queries of Q, N columns correspond to the documents of D, and each $(q,d)$ entry has a value $c(q,d)$, which corresponds to the number of clicks between query $q \in Q$ and document $d \in D$. Let $A'_C$ be an $(M+N) \times (M+N)$ matrix defined by:

$$A'_C = \begin{pmatrix} A_C & 0 \\ 0 & A_C^T \end{pmatrix}.$$

and let $N_C$ be the row-stochastic version of $A'_C$. Here again it is assumed that $N_C$ is defined to take care of the dangling nodes, so that if a row of $A_C$ has all zeroes, then the corresponding row of $N_C$ has all values equal to $1/(M+N)$. Finally, let $1_C$ be an $(M+N) \times (M+N)$ matrix that has value $1/(M+N)$ in all of its entries; then, the transition-probability matrix that describes the random walk on the click graph is $P_C = \alpha N_C + (1-\alpha)1_C$.

Using the notation introduced above, the random walk on the hyperlink-click graph is defined as follows. First, $A_H$ becomes an $(M+N) \times (M+N)$ matrix that includes the M queries and assumes that all rows corresponding to queries are zeroes. Second, let $N_H$ be the row-stochastic version of $A_H$, normalizing for dangling nodes (all newly-introduced queries M correspond to dangling nodes), and let $N_C$ remain as defined above. Third, let $1=1_C$.

Finally, a querying probability $\beta$ is introduced, which defines the rate at which a user switches between browsing and searching behavior. The transition-probability matrix for the random walk on the hyperlink-click graph is then given by the following equation:

$$P_{HC} = \alpha\beta N_C + \alpha(1-\beta)N_H + (1-\alpha)1.$$

The random walk defined by the above equation will be discussed, at a high level, below. First, with probability $(1-\alpha)$ the walk goes at random to either a query or a document. With probability $\alpha$, the walk follows a link in the hyperlink-click graph. The exact action depends on whether the current state is a document or a query. If the current state is a document u, then, with probability $\beta$, the next state is a query q for which there are clicks to u; and, with probability $(1-\beta)$ the next state is a document v pointed to by u. If the current state is a query, then, with probability $\beta$, the next state is a document for which there are clicks from the query; and, with probability $(1-\beta)$ the next state is any random document.

The random walk on the hyperlink-click graph generates scores (associated with the transition probabilities) for search queries, in addition to documents. The scores ascribed to search queries can be used by the system to, for example, inform query recommendation: given a user's search query, the hyperlink-click graph can be used to find other, similar queries (using known techniques together with additional information gleaned from the hyperlink-click graph such as, for example, graph distance between queries, number of paths at certain distances between queries, etc.), and then use those queries' scores to rank the queries and recommend alternative queries to the user.

A random walk may be executed on the hyperlink-click graph by a "random walker," which may be implemented either in software or hardware, and which also may be considered part of search infrastructure 100 (e.g., as implemented by, say, server 105).

Figure 3:
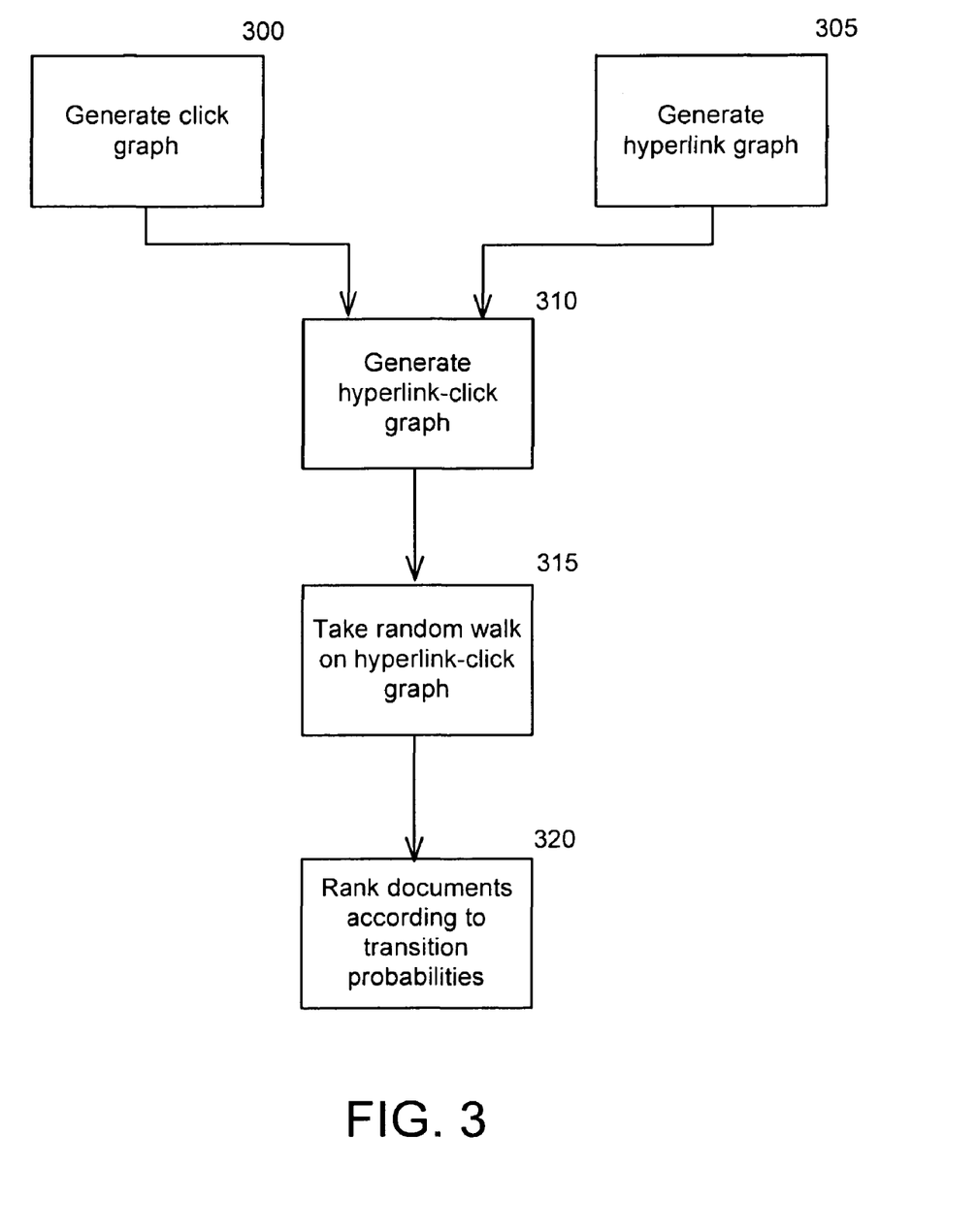
FIG. 3 is a logical flowchart of the general process of using a hyperlink-click graph to rank documents.

FIG. 3 is a flowchart that illustrates generally a process of using a hyperlink-click graph to rank documents. At blocks 300 and 305, the click graph and hyperlink graph are generated, as described herein. The union of the hyperlink and click graphs is taken at block 310, thereby generating the hyperlink-click graph, as described herein. As illustrated at block 315, a random walk is next taken on the hyperlink-graph, as described herein. The transition probabilities (or rather the scores associated with them) resulting from the random walk are then, at block 320, used to inform the ranking of the documents, as described herein.

The sequence and numbering of blocks depicted in FIG. 3 is not intended to imply an order of operations to the exclusion of other possibilities. Those of skill in the art will appreciate that the foregoing systems and methods are susceptible of various modifications and alterations. For example, while the flowchart in FIG. 3 shows the generation of the hyperlink-click graph occurring after the generation of the hyperlink and click graphs, it may be the case that the hyperlink-click graph is maintained all along (i.e., instead of as the union of the hyperlink and click graphs). Also, the sequence of generation of the click and hyperlink graphs is not fixed; one may be generated before the other, or both may be generated substantially concurrently.

Those of skill in the art also will appreciate that the methods described herein may be performed using a processor of a computer which executes instructions stored on a computer-readable medium. The medium may comprise a variety of volatile and non-volatile storage devices, systems, or elements, including but not limited to solid-state memory, fixed media devices, and removable media which may be used in computers having removable media devices.

Several features and aspects of the present invention have been illustrated and described in detail with reference to particular embodiments by way of example only, and not by way of limitation. Those of skill in the art will appreciate that alternative implementations and various modifications to the disclosed embodiments are within the scope and contemplation of the present disclosure. Therefore, it is intended that the invention be considered as limited only by the scope of the appended claims.

What is claimed is:

1. A method of ascribing scores to each of a plurality of documents and each of a plurality of search queries, said method comprising:

generating, from the plurality of search queries and a first subset of the plurality of documents, a click graph representative of relationships between the plurality of search queries and the documents comprising the first subset of documents;

generating, from a second subset of the documents, a hyperlink graph representative of relationships between the documents in the second subset;

generating, by using computer, a hyperlink-click graph from union of hyperlink graph and click graph, wherein:
    each node of the hyperlink-click graph corresponds either to one of the plurality of documents or one of the plurality of search queries;
    each directed edge between documents corresponds to the relationships defined in the hyperlink graph; and
    each undirected edge between documents and search queries corresponds to the relationships defined in the click graph;

conducting a random walk on the hyperlink-click graph which accounts for browsing behavior and searching behavior;

wherein a transition-probability matrix $P_{HC}$ for the random walk is given by:
    $P_{HC} = \alpha\beta N_c + \alpha(1-\beta)N_H + (1-\alpha)1$, where
    $\alpha$ is a probability that the random walk follows a link in the hyperlink graph;
    $\beta$ is a rate at which the random walk switches between searching behavior and browsing behavior;

$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the first subset of documents; and
each entry has a value associated with the number of clicks between the entry's corresponding search query and the entry's corresponding document;
$N_H$ is a row-stochastic version of $A_H$, where $A_H$ is an (M+N)×(M+N) matrix where all rows corresponding to search queries are zeroes; and
$1=1_c$ where $1_c$ is an (M+N)×(M+N) matrix in which each entry has a value of 1/(M+N); and
for each of the plurality of documents and search queries, associating a transition probability resulting from the random walk with a score.

2. The method of claim 1 further comprising ranking the plurality of documents according to at least their scores.

3. The method of claim 2 wherein the ranked documents are used by a search engine to order search results.

4. The method of claim 1 further comprising, in response to a search engine receiving a search query:
determining a subset of the plurality of search queries, where the subset comprises search queries that are similar to the search query received by the search engine;
ranking the search queries comprising the subset according to at least their scores; and recommending at least one of the subset of search queries.

5. The method of claim 4 wherein said determining is informed by at least the hyperlink-click graph.

6. The method of claim 1 further comprising using information gleaned from the random walk to inform a spam-detection algorithm.

7. The method of claim 1 wherein said generating a hyperlink graph and said generating a click graph occur in parallel.

8. The method of claim 1 wherein said generating a hyperlink graph, said generating a click graph, and said generating a hyperlink-click graph occur in parallel.

9. A method of ascribing scores to each of a plurality of documents and each of a plurality of search queries, said method comprising:
generating, by using a computer, a hyperlink-click graph wherein:
each node of the hyperlink-click graph corresponds either to one of the plurality of documents or to one of the plurality of search queries;
each directed edge corresponds to a relationship between two of the plurality of documents; and
each undirected edge corresponds to a relationship between one of the plurality of search queries and one of the plurality of documents, each document is associated with a search result related to search query;
conducting a random walk on the hyperlink-click graph which accounts for browsing behavior and searching behavior;
wherein a transition-probability matrix $P_{HC}$ for the random walk is given by:
$P_{HC} = \alpha\beta N_c + \alpha(1-\beta)N_H + (1-\alpha)1$, where
$\alpha$ is a probability that the random walk follows a link, in the hyperlink-click graph, representative of a relationship between documents of the plurality of documents;

$\beta$ is a rate at which the random walk switches between searching behavior and browsing behavior;

$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the plurality of documents; and
each entry has a value associated with the number of clicks between the entry's corresponding search query and the entry's corresponding document;
$N_H$ is a row-stochastic version of $A_H$, where $A_H$ is an (M+N)×(M+N) matrix where all rows corresponding to search queries are zeroes; and
$1=1_c$ where $1_c$ is an (M+N)×(M+N) matrix in which each entry has a value of 1/(M+N);
for each of the plurality of documents and search queries, associating a transition probability resulting from the random walk with a score.

10. A system, comprising:

a processor;

one or more non-transitory computer-readable media;

a click graph generator to generate, from a plurality of search queries and a first subset of a plurality of documents, a click graph representative of relationships between the plurality of search queries and the documents comprising the first subset of documents;

a hyperlink graph generator to generate, from a second subset of the documents, a hyperlink graph representative of relationships between the documents in the second subset;

a hyperlink-click graph generator to generate a hyperlink-click graph from union of hyperlink graph and click graph, wherein:
each node of the hyperlink-click graph corresponds either to one of the plurality of documents or one of the plurality of search queries;
each directed edge between documents corresponds to the relationships defined in the hyperlink graph; and
each undirected edge between documents and search queries corresponds to the relationships defined in the click graph; and a random walker to:
conduct a random walk on the hyperlink-click graph which accounts for browsing behavior and searching behavior; and
associate, for each of the plurality of documents and search queries, a transition probability resulting from the random walk with a score;

wherein a transition-probability matrix $P_{HC}$ for the random walk is given by:
$P_{HC} = \alpha\beta N_c + \alpha(1-\beta)N_H + (1-\alpha)1$, where
$\alpha$ is a probability that the random walk follows a link in the hyperlink graph;

$\beta$ is a rate at which the random walk switches between searching behavior and browsing behavior;

$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the first subset of documents; and
each entry has a value associated with the number of clicks between the entry's corresponding search query and the entry's corresponding document;
$N_H$ is a row-stochastic version of $A_H$, where $A_H$ is an (M+N)×(M+N) matrix where all rows corresponding to search queries are zeroes; and
$1=1_c$ where $1_c$ is an (M+N)×(M+N) matrix in which each entry has a value of 1/(M+N).

11. A non-transitory computer-readable medium encoded with a set of instructions which, when performed by a computer, cause the computer to perform steps of ascribing scores to each of a plurality of documents and each of a plurality of search queries, said steps comprising:
generating, from the plurality of search queries and a first subset of the plurality of documents, a click graph representative of relationships between the plurality of search queries and the documents comprising the first subset of documents;
generating, from a second subset of the documents, a hyperlink graph representative of relationships between the documents in the second subset;
generating a hyperlink-click graph from union of hyperlink graph and click graph, wherein:
each node of hyperlink-click graph corresponds either to one of the plurality of documents or one of the plurality of search queries;
each directed edge between documents corresponds to the relationships defined in the hyperlink graph; and
each undirected edge between documents and search queries corresponds to the relationships defined in the click graph;
conducting a random walk on the hyperlink-click graph which accounts for browsing behavior and searching behavior;
wherein a transition-probability matrix $P_{HC}$ for the random walk is given by:
$P_{HC}=\alpha\beta N_c+\alpha(1-\beta)N_H+(1-\alpha)1$, where
$\alpha$ is a probability that the random walk follows a link in the hyperlink graph;
$\beta$ is a rate at which the random walk switches between searching behavior and browsing behavior;
$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the first subset of documents; and
each entry has a value associated with the number of clicks between the entry's corresponding search query and the entry's corresponding document;
$N_H$ is a row-stochastic version of $A_H$, where $A_H$ is an (M+N)×(M+N) matrix where all rows corresponding to search queries are zeroes; and
$1=1_c$ where $1_c$ is an (M+N)×(M+N) matrix in which each entry has a value of 1/(M+N); and for each of the plurality of documents and search queries, associating a transition probability resulting from the random walk with a score.

12. The non-transitory computer-readable medium of claim 11, wherein the set of instructions further comprises instructions which, when performed by the computer, cause the computer to perform the step of ranking the plurality of documents according to at least their scores.

13. The non-transitory computer-readable medium of claim 12 wherein the ranked documents are used by a search engine to order search results.

14. The non-transitory computer-readable medium of claim 11, wherein the set of instructions further, comprises instructions which, when performed by the computer in response to a search engine receiving a search query, cause the computer to perform the steps of:
determining a subset of the plurality of search queries, where the subset comprises search queries that are similar to the search query received by the search engine;
ranking the search queries comprising the subset according to at least their scores; and recommending at least one of the subset of search queries.

15. The non-transitory computer-readable medium of claim 14 wherein said step of determining is informed by the hyperlink-click graph.

16. The non-transitory computer-readable medium of claim 11, wherein the set of instructions further comprises instructions which, when performed by the computer, cause the computer to perform the step of using information gleaned from the random walk to inform a spam-detection algorithm.

17. The non-transitory computer-readable medium of claim 11 wherein said steps of generating a hyperlink graph and generating a click graph occur in parallel.

18. The non-transitory computer-readable medium of claim 11 wherein said steps of generating a hyperlink graph, generating a click graph, and generating a hyperlink-click graph occur in parallel.

19. A non-transitory computer-readable medium encoded with a set of instructions which, when performed by a computer, cause the computer to perform steps of ascribing scores to each of a plurality of documents and each of a plurality of search queries, said steps comprising:
generating a hyperlink-click graph wherein:
each node of hyperlink-click graph corresponds either to one of the plurality of documents or to one of the plurality of search queries;
each directed edge corresponds to a relationship between two of the plurality of documents; and
each undirected edge corresponds to a relationship between one of the plurality of search queries and one of the plurality of documents, which document is associated with a search result related to a search query;
conducting a random walk on the hyperlink-click graph which accounts for browsing behavior and searching behavior;
wherein a transition-probability matrix $P_{HC}$ for the random walk is given by:
$P_{HC}=\alpha\beta N_c+\alpha(1-\beta)N_H+(1\alpha)1$, where α is a probability that the random walk follows a link, in the hyperlink-click graph, representative of a relationship between documents of the plurality of documents;

β is a rate at which the random walk switches between searching behavior and browsing behavior;

$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the plurality of documents; and
each entry has a value associated with the number of clicks between the entry's corresponding search query and the entry's corresponding document;

$N_H$ is the row-stochastic version of $A_H$, where $A_H$ is an (M+N)×(M+N) matrix where all rows corresponding to search queries are zeroes; and $1=1_c$ where $1_c$ is an (M+N)×(M+N) matrix in which each entry has a value of 1/(M+N); for each of the plurality of documents and search queries, associating a transition probability resulting from the random walk with a score.

20. A method of generating and using a hyperlink-click graph, wherein the hyperlink-click graph comprises a plurality of nodes, a plurality of directed edges, and a plurality of undirected edges, said method comprising the steps of:

taking a union of a hyperlink graph and a click graph, such that:
each resultant node corresponds either to one of a plurality of documents or to one of a plurality of search queries;
each resultant directed edge corresponds to a relationship between two of the plurality of documents; and
each resultant undirected edge corresponds to a relationship between one of a plurality of search queries and one of a plurality of documents, each document is associated with a search result related to a search query; conducting, by using a computer, a random walk on the union of the hyperlink graph and the click graph which accounts for browsing behavior and searching behavior;

wherein a transition-probability matrix $P_{HC}$ for the random walk is given by:

$P_{HC}=\alpha\beta N_c+\alpha(1-\beta)N_H+(1-\alpha)$ 1, where

α is the probability that the random walk follows a link, in the union of the hyperlink graph and the click graph, representative of a relationship between documents of the plurality of documents;

β is the rate at which the random walk switches between searching behavior and browsing behavior;

$N_c$ is the row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the plurality of documents; and
each entry has a value associated with the number of clicks between its corresponding search query and its corresponding document;

$N_H$ is the row-stochastic version of $A_H$, where $A_H$ is an (M+N)×(M+N) matrix where all rows corresponding to search queries are zeroes; and $1=1_c$ where $1_c$ is an (M+N)×(M+N) matrix in which each entry has a value of 1/(M+N).

21. A non-transitory computer-readable medium encoded with a set of instructions for generating and using a hyperlink-click graph, wherein the hyperlink-click graph comprises a plurality of nodes, a plurality of directed edges, and a plurality of undirected edges, wherein the set of instructions when executed by a computer cause the computer to perform steps comprising:

taking a union of a hyperlink graph and a click graph, such that:
each resultant node corresponds either to one of a plurality of documents or to one of a plurality of search queries;
each resultant directed edge corresponds to a relationship between two of the plurality of documents; and
each resultant undirected edge corresponds to a relationship between one of a plurality of search queries and one of a plurality of documents, each document is associated with a search result related to a search query;

conducting a random walk on the union of the hyperlink graph and the click graph which accounts for browsing behavior and searching behavior;

wherein a transition-probability matrix $P_{HC}$ for the random walk is given by:

$P_{HC}=\alpha\beta N_c+\alpha(1-\beta)N_H+(1-\alpha)$ 1, where

α is a probability that the random walk follows a link, in the union of the hyperlink graph and the click graph, representative of a relationship between documents of the plurality of documents;

β is a rate at which the random walk switches between searching behavior and browsing behavior;

$N_c$ is a row-stochastic version of $$A'_C = \begin{pmatrix} A_C & 0 \\ 0 & A_C^T \end{pmatrix},$$

where $A_c$ is an M×N matrix, whose:
M rows correspond to the plurality of search queries;
N columns correspond to the plurality of documents; and
each entry has a value associated with the number of clicks between its corresponding search query and its corresponding document;

$N_H$ is a row-stochastic version of $A_H$, where $A_H$ is an (M+N)×(M+N) matrix where all rows corresponding to search queries are zeroes; and $1=1_c$ where $1_c$ is an (M+N)×(M+N) matrix in which each entry has a value of 1/(M+N).

* * * * *